United States Patent
Goupil (10) Patent No.: US 7,725,224 B2
(45) Date of Patent: May 25, 2010

(54) METHOD AND DEVICE FOR DETECTING OSCILLATORY FAILURES IN A POSITION SERVOCONTROL SUBSYSTEM OF AN AIRCRAFT CONTROL SURFACE

(75) Inventor: Philippe Goupil, Beaupuy (FR)

(73) Assignee: Airbus France, Toulouse (FR)

( * ) Notice: Subject to any disclaimer, the term of this patent is extended or adjusted under 35 U.S.C. 154(b) by 742 days.

(21) Appl. No.: 11/601,746

(22) Filed: Nov. 20, 2006

(65) Prior Publication Data

US 2007/0124038 A1 May 31, 2007

(30) Foreign Application Priority Data

Nov. 28, 2005 (FR) .................................. 05 12000

(51) Int. Cl.
*G06F 19/00* (2006.01)
(52) U.S. Cl. ............................................. 701/29; 701/3
(58) Field of Classification Search .................... 701/1, 701/3, 14, 29; 340/945, 963; 702/127, 144, 702/182–185
See application file for complete search history.

(56) References Cited

U.S. PATENT DOCUMENTS

| 4,092,716 | A | | 5/1978 | Berg et al. |
| 4,826,110 | A | * | 5/1989 | Le ............................ 244/194 |
| 5,319,296 | A | * | 6/1994 | Patel ......................... 318/611 |
| 5,806,805 | A | * | 9/1998 | Elbert et al. .............. 244/195 |
| 7,567,862 | B2 | * | 7/2009 | Pelton et al. ................. 701/33 |
| 2003/0234324 | A1 | | 12/2003 | Kubica et al. |
| 2008/0265104 | A1 | * | 10/2008 | Fabre-Raimbault et al. ... 244/76 C |
| 2009/0048689 | A1 | * | 2/2009 | Pelton et al. ................. 700/33 |

\* cited by examiner

*Primary Examiner*—Yonel Beaulieu
(74) *Attorney, Agent, or Firm*—Dickinson Wright PLLC (57) ABSTRACT

A method and device for detecting oscillatory failures in a position servocontrol subsystem of an aircraft control surface. The detection device includes a estimation unit for estimating, using a control surface control instruction, a theoretical position corresponding to a reference position of the control surface, a computing unit for computing the difference between this theoretical position and an actual position measured by a sensor so as to form a residual value, and a comparison unit for comparing this residual value to a threshold value and making a count of the overshoots of this threshold value in order to detect an oscillatory failure.

15 Claims, 6 Drawing Sheets

METHOD AND DEVICE FOR DETECTING OSCILLATORY FAILURES IN A POSITION SERVOCONTROL SUBSYSTEM OF AN AIRCRAFT CONTROL SURFACE

FIELD OF THE INVENTION

The present invention relates to a method and a device for detecting oscillatory failures in at least one position servocontrol subsystem of an aircraft control surface, and an electrical flight control system comprising such a detection device.

The present invention applies to a servocontrol subsystem:
which is intended for the position servocontrol of all types of aircraft control surfaces, such as ailerons, spoilers or an elevator, for example;
which is part of an electrical flight control system of the aircraft; and
which comprises:
said control surface which is mobile, and the position of which relative to the aircraft is set by at least one actuator;
said actuator which sets the position of said control surface, according to at least one received actuation instruction;
at least one sensor which measures the actual position of said control surface; and
a computer which generates a control surface actuation instruction, transmitted to said actuator, from said measured actual position and a control instruction computed from the action of the pilot on a control column and the inertial state of the aircraft.

It is known that such a servocontrol subsystem comprises electronic components which are liable, in failure mode, to generate a spurious signal which can cause the servocontrolled control surface to oscillate. A phenomenon of this type is called "oscillatory failure".

Also known is that, when such an oscillatory failure has a frequency which is located within the bandwidth of the actuator, it has the effect of:
generating significant loads on the structure of the aircraft, which makes it necessary to reinforce this structure;
generating excessive loads if one of the natural vibration modes of the aircraft is excited (resonance effect, aeroelastic coupling), which can, in the extreme case, result in the destruction of the aircraft;
accelerating the fatigue of the actuator or actuators used; and
reducing the comfort of the passengers in the aircraft.

Complete coverage of such oscillatory failures would require excessively costly reinforcements of the structures of the aircraft. In practice, the aircraft is designed to absorb oscillatory failures of a certain amplitude, according to the frequency. Thus, monitoring systems must be put in place to ensure that the vibrations of the aircraft remain within a predetermined amplitude/frequency envelope.

However, the usual solutions for such monitoring are strongly dependent on:
the hardware used;
the type of piloting law of the aircraft (function of the flexibility or non-flexibility of the latter);
the acquisition and generation system of the computer; and
the failure modes of said computer.

Consequently, each particular family of aircraft each time has a corresponding particular usual solution, which does not offer any guarantee of being applicable to any other family of aircraft, existing or future.

Furthermore, the usual monitoring solutions normally offer a restricted coverage, more often than not providing only a detection of oscillations generated by a particular component of the servocontrol subsystem.

SUMMARY OF THE INVENTION

The object of the present invention is to remedy these drawbacks. It relates to a method, which is particularly robust and which can be applied to any type of aircraft with electrical flight controls, for detecting at least one oscillatory failure in at least one position servocontrol subsystem of at least one control surface of the aircraft, in particular of a transport aircraft, said method making it possible to detect an oscillatory failure of a minimal amplitude in a limited number of periods, and this regardless of the frequency of this oscillatory failure.

To this end, according to the invention, said method of detecting at least one oscillatory failure in at least one position servocontrol subsystem of at least one control surface of an aircraft, said servocontrol subsystem being part of an electrical flight control system of the aircraft, and comprising:
said control surface which is mobile, and the position of which relative to the aircraft is set by at least one actuator;
said actuator which sets the position of said control surface, according to at least one received actuation instruction;
at least one sensor which measures the actual position of said control surface; and
a computer which generates a control surface control instruction, which receives said measured actual position and which deduces from it an actuation instruction which is transmitted to said actuator, is noteworthy in that, automatically and repetitively, the following successive series of steps is carried out:
a) a theoretical position corresponding to a reference position of said control surface in the absence of failure is estimated, using said control surface control instruction which feeds a model of said actuator;
b) the difference between said theoretical position estimated in the step a) and the actual position measured by said sensor is computed so as to form a residual value; and
c) this residual value is compared to at least one predetermined threshold value, a count is made of all the successive and alternating overshoots of said predetermined threshold value by said residual value, and, when the number resulting from said count becomes greater than a predetermined number, an oscillatory failure is detected, representing a sinusoidal periodic signal, the frequency, amplitude and phase of which follow a uniform law (that is, they have no privileged values).

Thus, with the invention, the real operation of the monitored servocontrol subsystem (which is illustrated by the measured actual position) is compared to an expected ideal operation without failure (which is illustrated by said theoretical position), which makes it possible to reveal any oscillatory failure when it occurs. This comparison is performed by computing a residual value specified below.

Consequently, with the invention, it is possible to detect, in the monitored servocontrol subsystem, any oscillatory failure of a given minimal amplitude in a given number of periods, as specified below. Furthermore, this detection is particularly robust, since it does not theoretically provoke any false alarms.

Moreover, the method according to the invention makes it possible to detect all the failure modes existing in a servocontrol subsystem, and can be applied to any type of aircraft.

In a particular embodiment, in the step c), before the count is made, said residual value is broken down, for example using at least one recursive digital filter, into at least one frequency band so as to optimize the count by processing a residual value with noise eliminated, to filter out the very low frequencies for which detection is not required. This makes it possible to eliminate all the spurious signals outside of said frequency band to improve the robustness of the method according to the invention. Preferably, said residual value is broken down into a plurality of different frequency bands.

The count is made in a limited time window, in order not to accumulate transient spurious threshold overshoots and in order not to count the low frequency oscillations that are detected by other usual methods.

This particular embodiment makes it possible to optimize the detection of an oscillatory failure, by processing the residual value only in one or more time windows in which the threshold value overshoots are representative of a researched oscillatory failure. Furthermore, by this breakdown into frequency bands, it is also possible to provide different failure levels according to the frequency band. This latter characteristic makes it possible to improve the robustness of the detection method according to the invention.

In a first simplified embodiment, in the step a), to estimate the theoretical position at a current instant $\underline{n}$, a simplified model is used which integrates a speed which results from the conversion of a current i(n) into a speed, which is determined from the following expression:

$$i(n) = K \cdot [o(n) - s(n-1)]$$

in which:
K is a predetermined servocontrol gain;
o(n) is a position corresponding to said control surface control instruction; and
s(n−1) is the theoretical position estimated at an instant n−1 preceding the current instant $\underline{n}$.

Furthermore, in a second preferred embodiment, in the step a), to estimate the theoretical position, a speed $\underline{v}$ is integrated which is calculated from the following expressions:

$$\begin{cases} v = vc \cdot Cp \\ Cp = \sqrt{(\Delta P - Pc - [(Fa + Ka.v^2)/Sa])/\Delta Pref} \end{cases}$$

in which:
vc is a speed controlled by said computer;
ΔP is a differential supply pressure at the terminals of the actuator;
Pc is an opening pressure for insulating valves of the actuator;
Fa represents the aerodynamic forces applied to the control surface;
Ka·v² represents a particular force, specified below, which is generated by the actuator;
Sa represents the surface area of a transverse section of a piston of the actuator; and
ΔPref represents a predetermined pressure value.

Moreover, advantageously, in the step c), a count is made:
in the case of a liquid failure specified below, around a zero value; and
in the case of a solid failure also specified below, around a value corresponding to the opposite of the value of the theoretical position determined in the step a).

Of course, by simultaneously providing the above two types of count, it is possible to detect all types of failures, both liquid failures and solid failures.

Furthermore, advantageously, in the case of detection of an oscillatory failure in the step c), it is also possible to determine:
the nature (solid, liquid) of this oscillatory failure; and/or
the frequency of said oscillatory failure.

The present invention also relates to a device for detecting at least one oscillatory failure in at least one position servocontrol subsystem (of the abovementioned type) of at least one control surface (aileron, spoiler, elevator, rudder) of an aircraft, in particular of a transport aircraft. As indicated previously, within the scope of the present invention, an oscillatory failure is considered to be a sinusoidal periodic signal, the frequency, amplitude and phase of which follow a uniform law, which means that they have no privileged values.

According to the invention, said detection device is noteworthy in that it comprises:
first means for estimating, using said control surface control instruction, a theoretical position corresponding to a reference position of said control surface in the absence of failure;
second means for computing the difference between said theoretical position estimated by said first means and the actual position measured by said sensor so as to form a residual value; and
third means for:
comparing this residual value to at least one predetermined threshold value;
making a count of all the successive and alternating overshoots of said predetermined threshold by said residual value; and
detecting an oscillatory failure when the number resulting from said count becomes greater than a predetermined number.

In a particular embodiment, said third means comprise filtering means, preferably recursive digital filters, for example 4th order Chebyshev filters, for breaking down said residual value into at least one frequency band so as to optimize the count by processing a residual value with noise eliminated, to filter out the very low frequencies for which detection is not required. This makes it possible to eliminate all the spurious signals outside of said frequency band to improve the robustness of the detection device according to the invention.

Furthermore, in a particular embodiment, said third means comprise a counting unit comprising:
a first counting element for making a count concerning liquid failures; and
a second counting element for making a count concerning solid failures.

This latter particular embodiment therefore makes it possible to detect both liquid failures and solid failures.

The present invention also relates to an electrical flight control system of an aircraft, of the type comprising:
at least one usual means (comprising for example a control column) for generating a control surface control instruction for at least one control surface of the aircraft; and
at least one position servocontrol subsystem of this control surface, of abovementioned type.

According to the invention, this electrical flight control system is noteworthy in that it also comprises at least one oscillatory failure detection device, as described previously.

BRIEF DESCRIPTION OF THE DRAWINGS

The figures of the appended drawing will clearly show how the invention can be produced. In these figures, identical references denote similar elements.

DETAILED DESCRIPTION OF THE INVENTION

Figure 1:
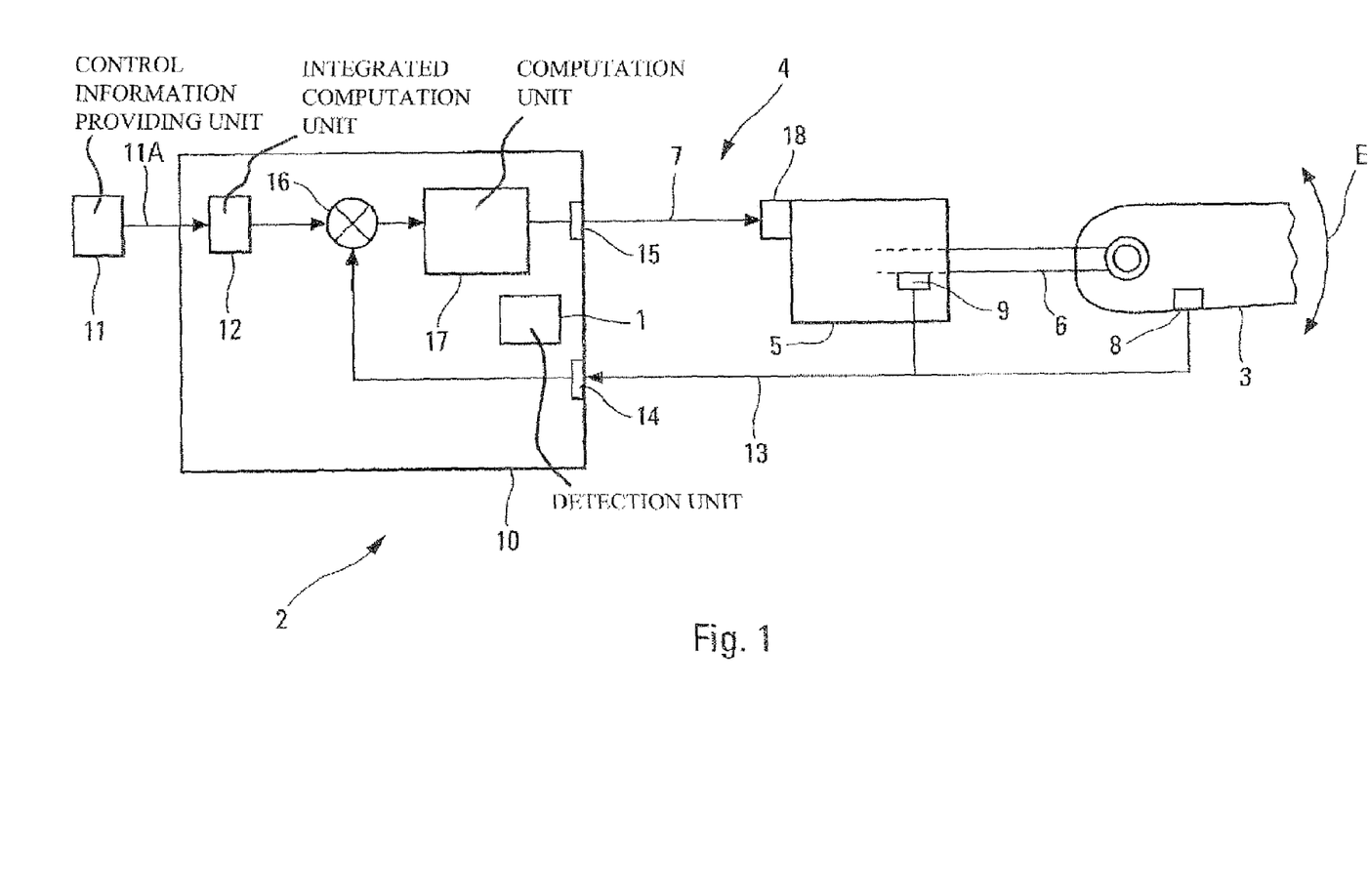
FIG. 1 diagrammatically illustrates a position servocontrol subsystem of an aircraft control surface, which comprises a detection device according to the invention.
Figure 2:
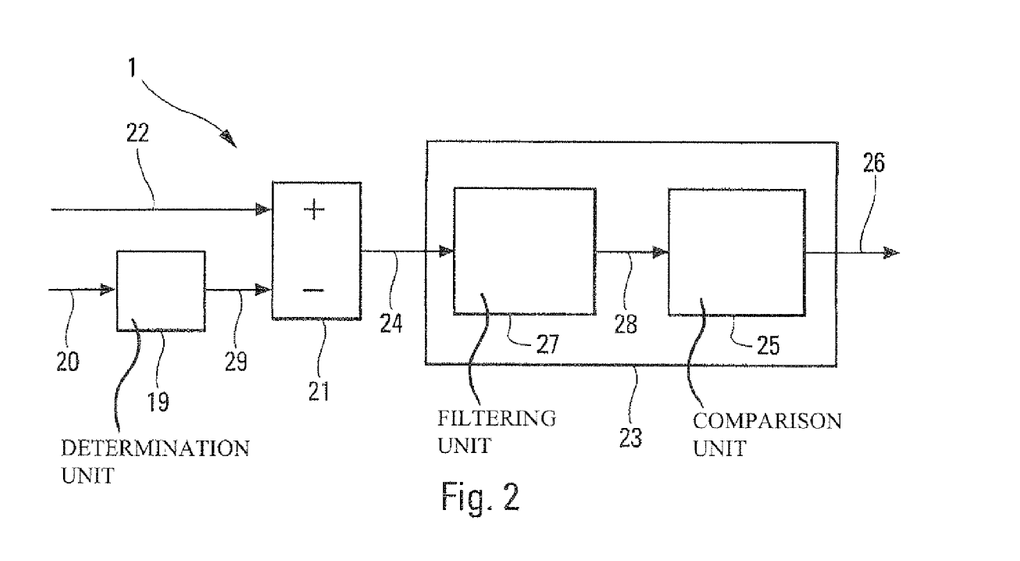
FIG. 2 is the block diagram of a detection device according to the invention.

The device 1 according to the invention and diagrammatically represented in FIG. 2 is intended to detect at least one oscillatory failure in at least one position servocontrol subsystem 2 (represented in FIG. 1) of at least one control surface 3 (aileron, spoiler, elevator, rudder) of an aircraft, in particular of a transport aircraft.

Usually, this servocontrol subsystem 2 is part of an electrical flight control system 4 of the aircraft and comprises:
- said control surface 3 which is mobile, being likely to be deflected as illustrated by a double arrow E in FIG. 1, and the position of which relative to the structure of the aircraft is set by at least one usual actuator 5;
- said actuator 5 which sets the position of said control surface 3, for example via a rod 6 which acts on the latter, according to at least one actuation instruction received via a link 7;
- at least one sensor 8, 9 which measures the actual position of said control surface 3. To this end, it can be a sensor 8 which is directly associated with the control surface 3 and/or a sensor 9 which measures, for example, the displacement of the rod 6 of the actuator 5; and
- a computer 10, for example a flight control computer:
  - which receives control information from means 11, via a link 11a. These means 11 are usual means for generating control information and comprise, for example, a control column which is likely to be actuated by a pilot of the aircraft, and inertial sensors;
  - which generates in a usual manner a control surface control instruction, using an integrated computation means 12 which contains piloting laws and which uses for this generation control information (action of the pilot on the control column, parameters that indicate the position of the aircraft about its center of gravity, load factors to which it is subject) received from said means 11;
  - which receives the actual position measured by the sensor or sensors 8 and 9, via a link 13, via an analog input 14;
  - which computes, from the preceding information (control surface control instruction and measured actual position) said actuation instruction, using an integrated computation means 17 taking account of a predetermined gain; and
  - which transmits this actuation instruction to a servovalve 18 of the actuator 5, via the link 7 via an analog output 15.

All the elements of this servocontrol subsystem 2 which contain electronic components, and in particular the sensors 8, 9, the analog input 14, the analog output 15, . . . , are sources of oscillatory failures, that is, of failures that are likely to generate a spurious electrical signal that can make the control surface 3 oscillate.

Said electrical flight control system 4 comprises, in addition to said servocontrol subsystem 2, the device 1 according to the invention which is intended to detect any oscillatory failure of the abovementioned type.

To do this, said detection device 1 comprises, as represented in FIG. 2:
- means 19 specified below for determining, using the control surface control instruction generated by said computation means 12 and received via a link 20 which is, for example, linked to the output of said computation means 12, a theoretical position which corresponds to a reference position of the control surface 3 in the absence of oscillatory failure and which is compliant with said control surface control instruction;
- a computation means 21 for computing the difference between the actual position of the control surface 3 (which is measured by the sensor 8, 9 and which is received via a link 22 which is, for example, linked to said link 13) and the theoretical position (which is determined by said means 19 and which is received via a link 29) so as to form a residual value specified below; and
- a processing unit 23 which is linked via a link 24 to said computation means 21 and which comprises means 25 for:
  - comparing this residual value to at least one predetermined threshold value S;
  - making a count of all overshoots, the both successive and alternating, of said threshold value S by said residual value; and
  - detecting an oscillatory failure when the number resulting from said count becomes greater than a predetermined number.

Thus, the device 1 according to the invention compares the actual operation of the monitored servocontrol subsystem 2 (which is illustrated by the measured actual position of the control surface 3) to an expected ideal operation without failure (which is illustrated by said calculated theoretical position of the control surface 3), which makes it possible to reveal any oscillatory failure when it occurs.

Consequently, said device 1 is able to detect, in the monitored servocontrol subsystem 2, any oscillatory failure of a given minimal amplitude in a given number of periods, as specified below. Furthermore, this detection is particularly robust, since it does not provoke any false alarms.

Furthermore, the device 1 according to the invention makes it possible to detect all the existing failure modes in the abovementioned type of servocontrol subsystem 2, and is applicable to any type of aircraft.

In a preferred embodiment, said processing unit 23 also includes filtering means 27 which are linked via a link 28 to said means 25 and which are intended to break down the received residual value into a plurality of frequency bands B1, B2, B3, which makes it possible to process residual values with noise eliminated and to define a plurality of corresponding time windows, in which the count is then made via the means 25. This is diagrammatically represented in FIG. 3 which illustrates a gain G according to the frequency F and diagrammatically shows the different frequency bands B1, B2, B3.

To do this, said filtering means 27 preferably include recursive digital filters, called IIR (Infinite Impulse Response) filters, which are more selective than non-recursive filters. In a particular embodiment, 4th order Chebyshev filters are used as recursive digital filters, which allow for a good attenuation at zero frequency and thus ensure that a non-zero average failure is well detected by the counting means 25. The attenuation in the filtered bands is high, which makes it possible to correctly eliminate the noise from the residual value. Furthermore, the in-band attenuation is low, which ensures a good conservation of the signal.

Figure 3:
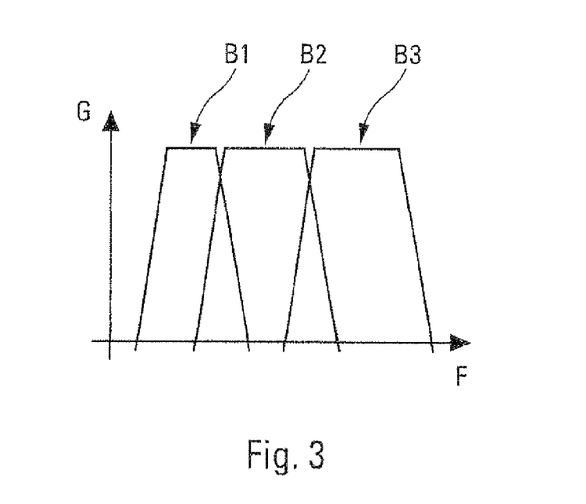
FIG. 3 is a graph diagrammatically illustrating a breakdown into frequency bands, implemented by filtering means of a detection device according to the invention.

As an example, it is possible to choose to break down the residual value calculated by the computation means 21 into three frequency bands B1, B2 and B3, such that:
the band B1 represents frequencies F of 0.5 to 1 Hz;
the band B2 represents frequencies F of 1 to 3 Hz; and
the band B3 represents frequencies F of 3 to 5 Hz.

Said filtering means 27 also make it possible to avoid counting transient threshold overshoots and to filter out very low frequencies for which detection is not required. To this end, time windows are defined, outside of which the threshold value overshoots are no longer taken into account. Furthermore, the size of each time window can be adapted to each band start frequency. The more the frequency rises towards the high frequencies, the more the size of the corresponding time window is reduced, and the more the transients are rapidly eliminated. Another advantage of the breakdown into frequency bands B1 to B3 is that it is possible to fix different failure levels, according to the frequency, which corresponds to a reality concerning the loads on the structure of the aircraft. As an illustration, it may be necessary to detect 1° failures between 1 and 3 Hz, and 2° outside of this frequency band.

Furthermore, the breakdown into frequency bands B1 to B3 makes it possible to retain only the frequency components that are of interest, such that the processes are performed on residual values that are not disturbed by spurious frequencies.

From all of the above, it is obvious that said filtering means 27 contribute to the robustness of the detection device 1 according to the invention.

Within the framework of the present invention, an oscillatory failure is considered to be a sinusoidal periodic signal, the frequency, amplitude and phase of which follow a uniform law, which means they have no privileged values.

Figure 4:
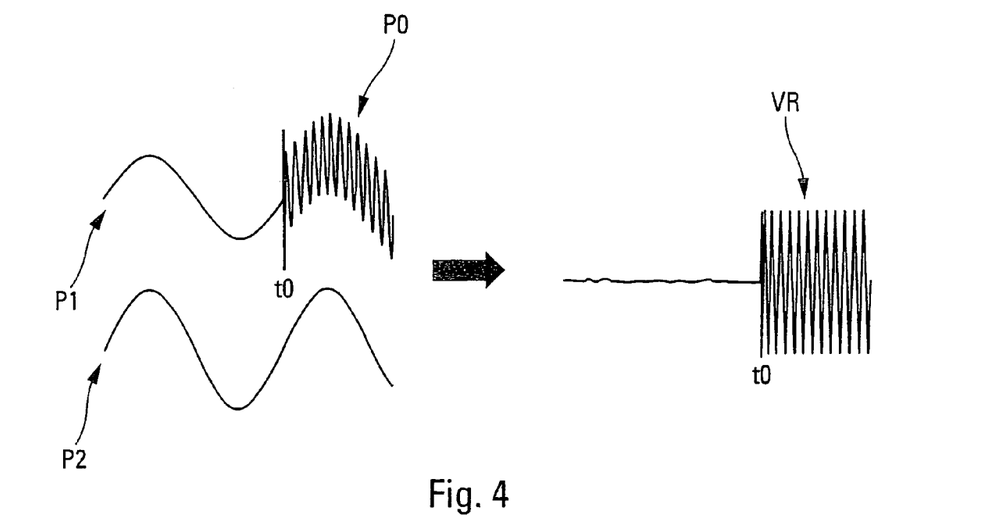
FIGS. 4 and 5 are diagrams illustrating two types of failure, namely a liquid failure and a solid failure respectively.
Figure 5:
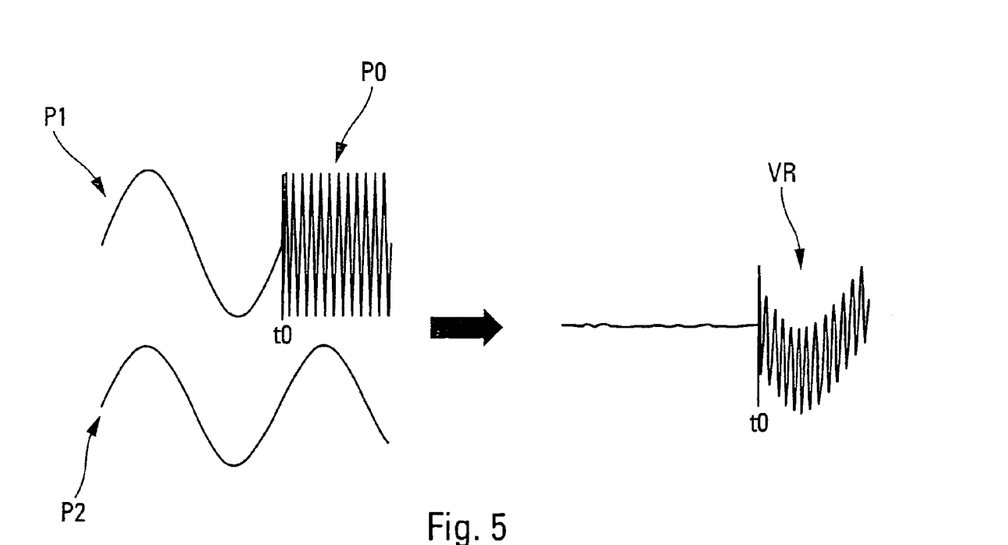

It is known that, on a servocontrol subsystem 2, two types of failure can be encountered:
so-called "liquid" failures, as represented in FIG. 4; and
so-called "solid" failures, as illustrated in FIG. 5.

A liquid failure is added to the signal circulating in the servocontrol subsystem 2, whereas a solid failure replaces that signal.

FIGS. 4 and 5 show:
in the left-hand part:
the actual position P1 of the control surface 3 on which an oscillatory failure P0 appears at an instant t0; and
the theoretical position P2 of the control surface 3; and
on the right-hand part, the corresponding residual value VR.

As can be seen in FIG. 4, in the case of a liquid failure, before this failure appears (that is, before an instant t0), the residual value VR is made up only of the modeling noise. From the instant t0, the failure signal is mixed with the noise.

In the case of a solid failure, as represented in FIG. 5, from the instant t0, the residual value VR is formed by the failure signal P0 which is mixed opposite to the theoretical position P2 of the control surface 3, since the residual value VR corresponds to the difference between the actual position P1 and the theoretical position P2.

As indicated previously, the function of the means 25 is to detect an oscillatory failure on the residual value VR by counting the oscillations. To do this, said means 25 count the successive and alternating overshoots of a threshold value S corresponding to the minimum amplitude that is to be detected. As specified below, said means 25 make the count:
in the case of a liquid failure, around a zero value, as represented in FIG. 6; and
in the case of a solid failure, around a value corresponding to the opposite of the value of the theoretical position determined by the means 19.

Figure 6:
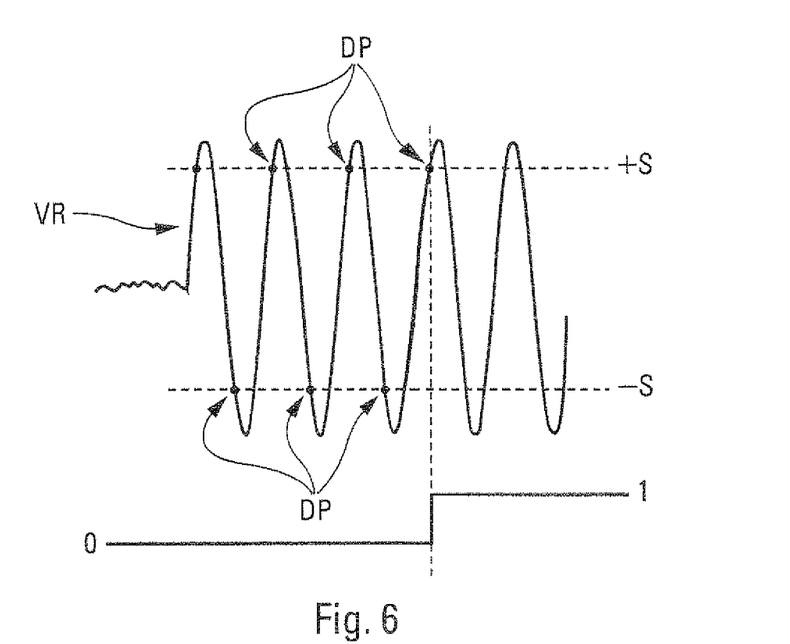
FIG. 6 is a graph showing a particular count implemented by a detection device according to the invention.

Thus, the half-oscillation periods are counted, as illustrated in FIG. 6 in which the half-periods DP counted are illustrated by black dots. When the required number of periods is reached, namely three in the example of FIG. 6 (that is, six half-periods from the first threshold overshoot), the means 25 indicate the presence of an oscillatory failure, for example by switching a corresponding binary value from 0 to 1.

It will be noted that, if $s1(n)$ is the value of the actual position P1 of the control surface 3, measured by the sensor(s) 8, 9 and $s2(n)$ is the value of the theoretical position P2 determined by the means 19, the value r(n) of the residual value VR is expressed in the absence of failure:

$$r(n)=s1(n)-s2(n)$$

In the case of a liquid failure p(n), the residual value is expressed as:

$$r(n)=s1(n)+p(n)-s2(n)$$

$$r(n)=e(n)+p(n)$$

with p(n) being the failure signal, normally a sinusoid, and e(n) a noise, mainly the modeling noise (due to the imperfection of the model used).

Also, the noise of the sensor 8, 9 is found, but its power is very low. If the model is accurate enough, the noise is of low power and of zero average. The failure can comprise a continuous component, but it will be eliminated by the filtering. The failure can therefore be detected by a count of oscillations around zero, that is, relative to +S and −S as represented in FIG. 6.

In the case of a solid failure, the position $s1(n)$ measured by the sensor(s) 8, 9 corresponds only to the failure p(n), and the residual value r(n) is then expressed as:

$$r(n)=p(n)-s2(n)$$

In this case, the failure signal is mixed opposite to the estimated theoretical position $s2(n)$ and a count around zero does not allow for detection. On the other hand, a count around $-s2(n)$ makes it possible to detect oscillations of p(n).

Figure 7:
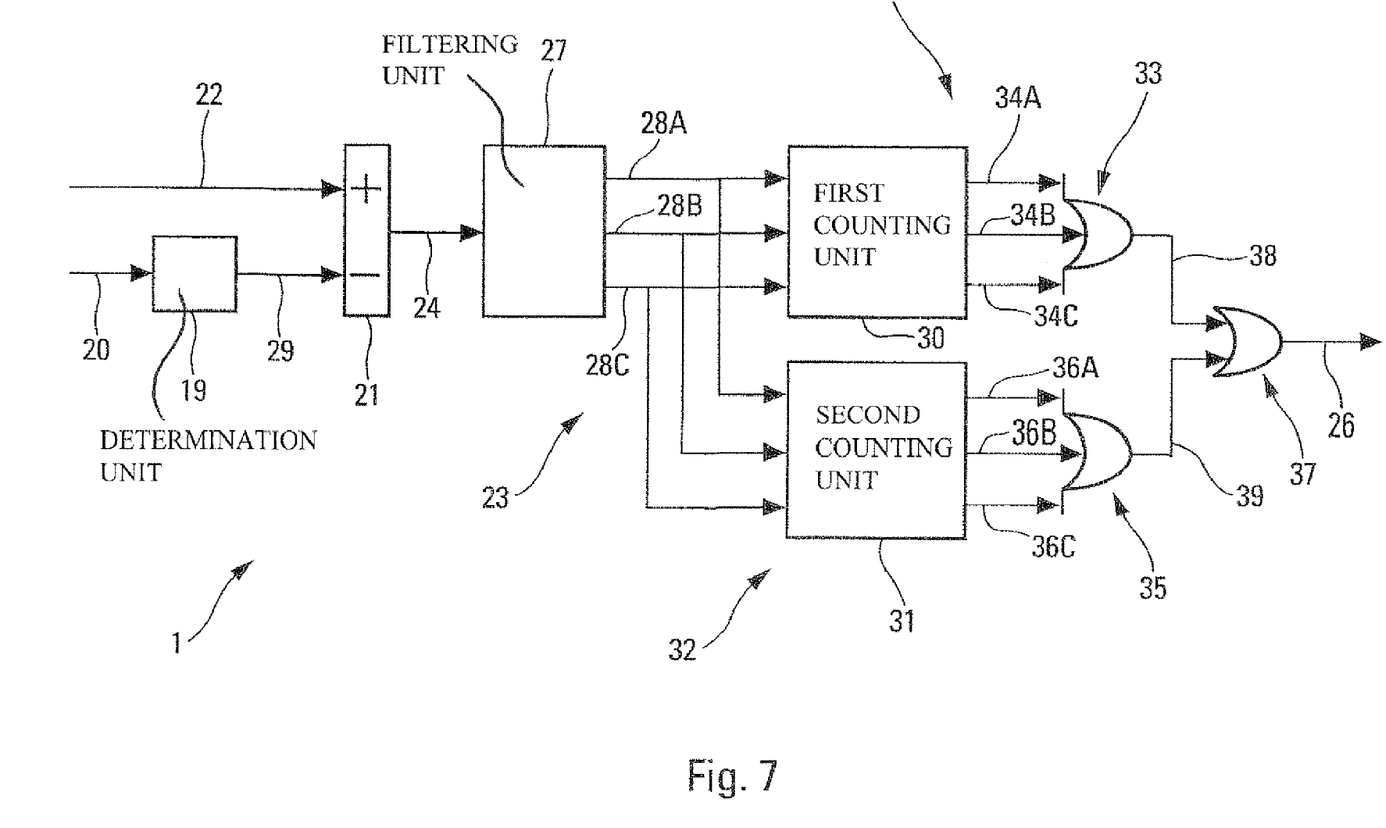
FIG. 7 is the block diagram of a particular embodiment of a detection device according to the invention, which can be used to detect liquid failures and solid failures simultaneously.

In a preferred embodiment represented in FIG. 7, said means 25 comprise a counting unit 32 comprising a first counting element 30 for making a count of oscillations relating to liquid failures and a second counting element 31 for making a count of oscillations relating to solid failures. In this preferred embodiment, said means 27 produce a breakdown into three frequency bands such that the counting elements 30 and 31 are respectively linked via three links 28A, 28B and 28C (forming the link 28) to said means 27. Furthermore, said means 25 also include:

- an OR logic gate 33 which is linked, via links 34A, 34B and 34C (respectively associated with said frequency bands), to said counting element 30;
- an OR logic gate 35 which is linked, via links 36A, 36B and 36C (respectively associated with said frequency bands), to said counting element 31; and
- an OR logic gate 37 which is linked respectively via links 38 and 39 to said OR logic gates 33 and 35.

By simultaneously including the abovementioned two counting elements 30 and 31, the device 1 according to this preferred embodiment is able to detect all types of failures, both liquid failures and solid failures.

In a particular embodiment, said processing unit 23 also includes means (not specifically represented) for, in case of detection of an oscillatory failure, also determining the nature (solid, liquid) of this oscillatory failure, and its frequency.

In the framework of the present invention, said means 19 intended to determine the theoretical position of the control surface 3 can be produced in different ways.

Figure 8:
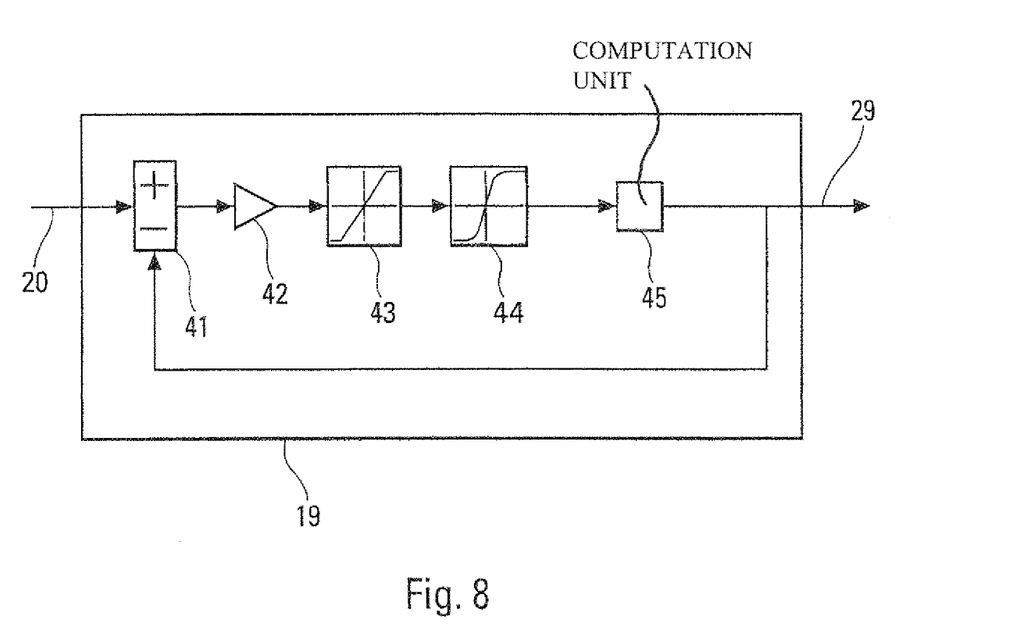
FIGS. 8 and 9 are block diagrams of two different embodiments of processing means that are part of a detection device according to the invention and that are intended to determine theoretical positions.

In a first simplified embodiment represented in FIG. 8, said means 19 comprise:

- a computation means 41 which computes the difference between the position corresponding to said control surface control instruction, which is received via the link 20, and the theoretical position which is determined at the instant preceding the current instant and which is sampled on the link 29;
- a computation means 42 which multiplies the value received from the computation means 41 by a predetermined servocontrol gain K, to obtain a current value;
- a means 43 which produces a current limiting;
- a means 44 which converts into speed the current determined by the computation means 42 and limited by the means 43; and
- a computation means 45 which integrates the speed received from said means 44, to obtain said theoretical position at the current instant which is transmitted via the link 29.

Consequently, in this first simplified embodiment represented in FIG. 8, to determine the theoretical position at a current instant $\underline{n}$, said means 19 integrate a speed which results from the conversion into speed of a current i(n) which is determined from the following expression:

$$i(n) = K \cdot [o(n) - s(n-1)]$$

in which:
K is said predetermined servocontrol gain;
o(n) is the position corresponding to said control surface control instruction; and
s(n−1) is the theoretical position determined at an instant n−1 preceding the current instant $\underline{n}$.

Figure 9:
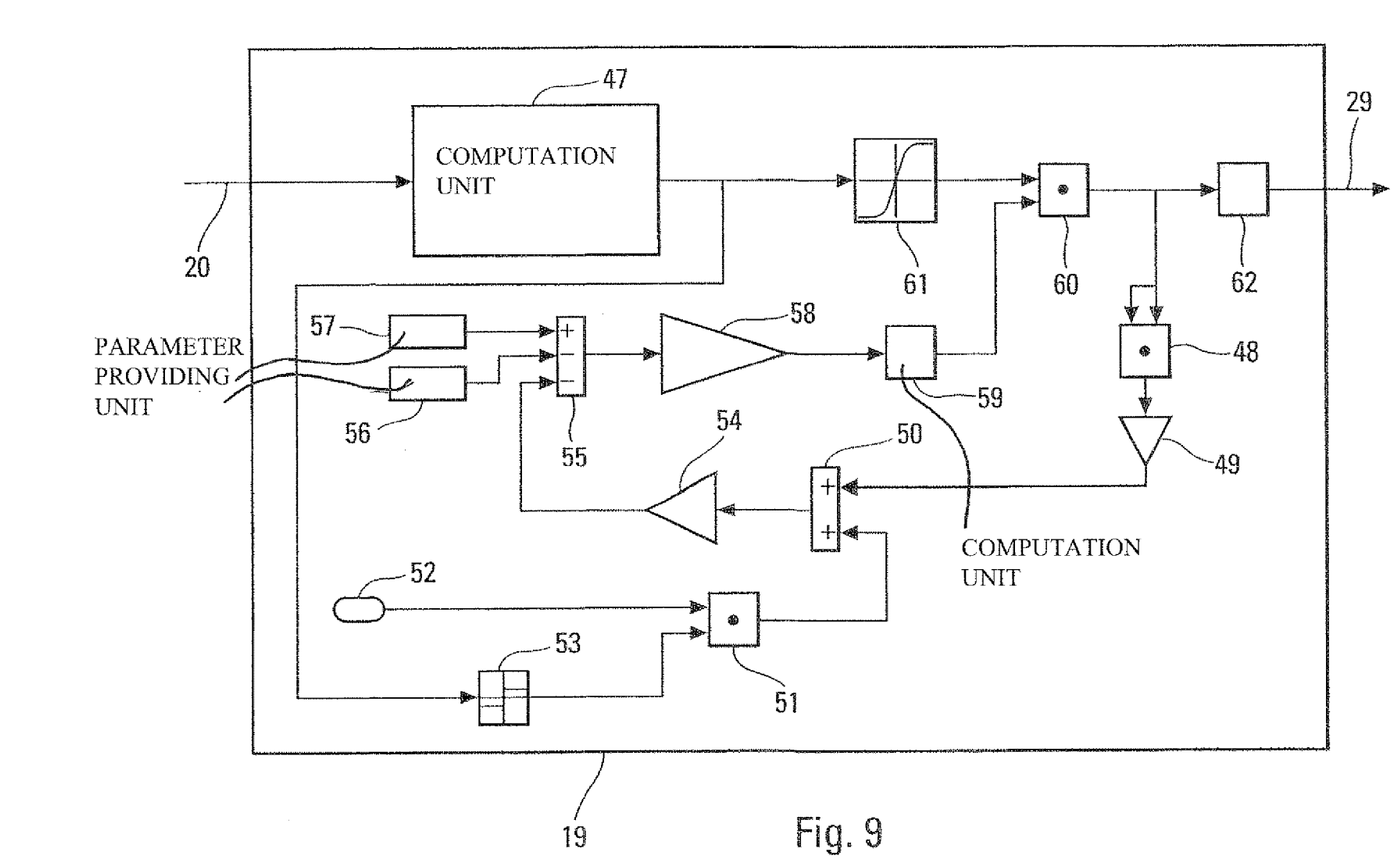

Moreover, in a second preferred embodiment, which is represented in FIG. 9, said means 19 comprise:

- a computation means 47 for determining a current value, in the manner specified below with reference to FIG. 8;
- a computation means 48 which calculates the square of a speed $\underline{v}$;
- a computation means 49 which multiplies this speed squared by a predetermined damping coefficient Ka in damped mode. The output of this computation means 49 therefore supplies a product $Ka \cdot v^2$ which represents the force generated by the actuator 5 in a damped mode. It will be noted that the servocontrol subsystem 2 normally comprises two actuators 5 (which are mounted in parallel) for each control surface 3 (aileron, elevator, rudder where appropriate), namely a first actuator 5 which drives the control surface 3 and which is in so-called active mode and a second actuator 5 which is in a so-called damped state and which follows the movement provoked by the active actuator. If a failure is detected on the control subsystem servocontrolling the first actuator 5, the latter is set to the damped mode and it is the actuator 5 on standby, initially in damped mode, which switches to active mode and which takes over control;
- a computation means 50 which computes the sum between, on the one hand, the output of the computation means 49 and, on the other hand, the output of a multiplier 51 which multiplies a parameter obtained from a means 52, by the sign (determined by a means 53) of the output current of the computation means 47, so as to obtain a parameter Fa corresponding to the aerodynamic forces applied to the control surface 3;
- a computation means 54 which divides the output of the computation means 50 by a parameter Sa which represents the surface area of a transverse section of the piston 6 of the actuator 5;
- a computation means 55 which subtracts the output of the computation means 54, and a parameter Pc representing an opening pressure of insulating valves of the actuator 5, which is received from a means 56, from a parameter ΔP which represents a differential supply pressure at the terminals of the actuator 5 and which is received from a means 57;
- a computation means 58 which divides the output of the computation means 55 by a parameter ΔPref which represents a predetermined pressure value;
- a computation means 59 which calculates the square root of the output of the computation means 58;
- a computation means 60 which multiplies the output of the computation means 59 by a speed obtained by the conversion (implemented by a computation means 61) of the current from the computation means 47; and
- a computation means 62 which integrates the speed available at the output of the computation means 60 so as to obtain said theoretical position which is transmitted by the link 29.

Consequently, in this second embodiment represented in FIG. 9, to determine the theoretical position, said means 19 integrate a speed $\underline{v}$ which is computed from the following expressions:

$$\begin{cases} v = vc \cdot Cp \\ Cp = \sqrt{(\Delta P - Pc - [(Fa + Ka \cdot v^2)/Sa])/\Delta Pref} \end{cases}$$

with vc being a controlled speed obtained from the current derived from the computation means 47.

The detection device 1 according to the invention therefore makes it possible to detect, in the servocontrol subsystem 2, oscillatory failures of a given minimal amplitude in a given number of periods. As an illustration, said detection device 1 can be formed so as to be able to detect 1° failures on the control surface 3, in three periods, over a frequency range which extends from 0.2 to 5 Hz.

The invention claimed is:

1. A method of detecting at least one oscillatory failure in at least one position servocontrol subsystem of at least one control surface of an aircraft, said servocontrol subsystem being part of an electrical flight control system of the aircraft, said method comprising:

setting a position of said control surface relative to the aircraft surface, in accordance with at least one received actuation instruction, wherein said control surface is mobile;

measuring the actual position of said control surface; and operating a computer to (i) generate a control surface control instruction, (ii) receive said measured actual position, and (iii) deduce from said measured actual position an actuation instruction which is transmitted to said actuator, wherein, automatically and repetitively, the following successive series of steps is carried out:

a) estimating a position corresponding to a reference position of said control surface in the absence of failure using said control surface control instruction which feeds a model of said actuator;

b) computing a difference between said position estimated in step a) and said actual position to form a residual value; and c) comparing the residual value to at least one predetermined threshold value, counting successive and alternating overshoots of said predetermined threshold value by said residual value, and, determining that an oscillatory failure exists when the number resulting from said count becomes greater than a predetermined number, representing a sinusoidal periodic signal, the frequency, amplitude and phase of which follow a uniform law.

2. The method as claimed in claim 1, wherein, in step c), before the count is made, said residual value is broken down into at least one frequency band and the count is optimized by processing a residual value with noise eliminated, to filter out the very low frequencies for which detection is not required.

3. The method as claimed in claim 2, wherein said residual value is broken down into a plurality of different frequency bands.

4. The method as claimed in claim 2, wherein, at least one recursive digital is employed to break down the residual value into at least one frequency band.

5. The method as claimed in claim 1, wherein, in step a), to estimate the position at a current instant $\underline{n}$, there is integrated a speed which results from the conversion of a current $i(n)$ into a speed, which is determined from the following expression: $i(n)-K_*[(o(n)-s(n-1)]$ in which:

K is a predetermined servocontrol gain;

$o(n)$ is a position corresponding to said control surface control instruction; and $s(n-1)$ is the theoretical position estimated at an instant $n-1$ preceding the current instant $\underline{n}$.

6. The method as claimed in claim 1, wherein, in step a), to estimate the position, a speed $\underline{v}$ is integrated which is calculated from the following expressions:

$$\begin{cases} v = vc \cdot Cp \\ Cp = \sqrt{(\Delta P - Pc - [(Fa + Ka.v^2)/SA])/\Delta Pref} \end{cases}$$

in which:

vc is a speed controlled by said computer;

$\Delta P$ is a differential supply pressure at the terminals of the actuator;

Pc is an opening pressure for insulating valves of the actuator;

Pa represents the aerodynamic forces applied to the control surface;

$Ka \cdot v^2$ represents a particular force which is generated by the actuator;

Sa represents the surface area of a transverse section of a piston of the actuator; and $\Delta Pref$ represents a predetermined pressure value.

7. The method as claimed in claim 1, wherein, in step c), the count is made around a zero value.

8. The method as claimed in claim 1, wherein, in step c), the count is made around a value corresponding to the opposite of the value of the position determined in step a).

9. The method as claimed in claim 1, wherein, in the case of detection of an oscillatory failure in step c), a nature of this oscillatory failure is also determined.

10. The method as claimed in claim 1, wherein, in the case of detection of an oscillatory failure in step c), a frequency of this oscillatory failure is also determined.

11. A device for detecting at least one oscillatory failure in at least one position servocontrol subsystem of at least one control surface of an aircraft, said servocontrol subsystem being part of an electrical flight control system of the aircraft, said device comprising:

at least one actuator setting a position of said control surface relative to the aircraft surface, in accordance with at least one received actuation instruction wherein said control surface;

at least one sensor which measures the actual position of said control surface; and a computer which generates a control surface control instruction, which receives said measured actual position and which deduces from it an actuation instruction which is transmitted to said actuator, said computer comprising:

a first unit estimating, using said control surface control instruction, a position corresponding to a reference position of said control surface in the absence of failure;

a second unit computing the difference between said position estimated by said first unit and the actual position measured by said sensor so as to form a residual value; and a third unit:

comparing the residual value to at least one predetermined threshold value;

making a count of successive and alternating overshoots of said predetermined threshold by said residual value; and determining that an oscillatory failure exists when a number resulting from said count becomes greater than a predetermined number.

12. The device as claimed in claim 11, wherein said third unit comprises a filtering device for breaking down said residual value into at least one frequency band to optimize the count by processing a residual value with noise eliminated, to filter out very low frequencies for which detection is not required.

13. The device as claimed in claim 11, wherein said third unit comprises a counting unit comprising: a first counting element making a count concerning liquid failures; and a second counting element making a count concerning solid failures.

14. An electrical flight control system of an aircraft, said system comprising at least one unit generating a control surface control instruction for at least one control surface of the aircraft and at least one position servocontrol subsystem of this control surface, said system comprising:

at least one actuator setting a position of said control surface relative to the aircraft surface, in accordance with at least one received actuation instruction, wherein said control surface is mobile;

at least one sensor which measures the actual position of said control surface;

a computer which generates a control surface control instruction, which receives said measured actual position and which deduces from said measured actual position an actuation instruction which is transmitted to said actuator and at least one device as in claim 11 detecting at least one oscillatory failure in said servocontrol subsystem.

15. An aircraft, comprising an electrical flight control system as in claim 14.

* * * * *